US008145850B2

(12) United States Patent
Mopur et al.

(10) Patent No.: US 8,145,850 B2
(45) Date of Patent: Mar. 27, 2012

(54) METHOD AND SYSTEM FOR VISUALIZING A STORAGE AREA NETWORK

(75) Inventors: Satish Kumar Mopur, Karnataka (IN); Karthigeyan Kasthurirengan, Karnataka (IN); Unnikrishnan Ponnan Katangot, Karnataka (IN); Suman Sathyanarayana Palavalli, Karnataka (IN); Vijetha Vasanth Thanthry, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 12/537,256

(22) Filed: Aug. 7, 2009

(65) Prior Publication Data
US 2010/0325337 A1 Dec. 23, 2010

(30) Foreign Application Priority Data
Jun. 22, 2009 (IN) .......................... 1464/CHE/2009

(51) Int. Cl.
*G06F 12/00* (2006.01)
(52) U.S. Cl. ................. 711/147; 711/E12.001
(58) Field of Classification Search ........................ None
See application file for complete search history.

(56) References Cited

U.S. PATENT DOCUMENTS

| | | | |
|---|---|---|---|
| 7,315,985 B1 * | 1/2008 | Gauvin et al. | 715/734 |
| 7,506,040 B1 * | 3/2009 | Rabe et al. | 709/223 |
| 7,523,187 B1 * | 4/2009 | Lavallee et al. | 709/223 |
| 7,533,169 B1 * | 5/2009 | Gold et al. | 709/224 |
| 7,606,889 B1 * | 10/2009 | Kundala et al. | 709/223 |
| 2004/0215764 A1 * | 10/2004 | Allen et al. | 709/224 |
| 2007/0220203 A1 * | 9/2007 | Murase | 711/114 |
| 2008/0033897 A1 * | 2/2008 | Lloyd | 706/19 |

* cited by examiner

*Primary Examiner* — Kevin Verbrugge (57) ABSTRACT

A method and system for visualizing a SAN is disclosed. In one embodiment, a method for visualizing a SAN includes scanning SAN components in the SAN to determine respective types of the SAN components and connectivity information between the SAN components. The method also includes generating a hierarchically-laid-out SAN graph by determining respective positions of the SAN components in the SAN based on the types of the SAN components and the connectivity information. The method further applying a force-directed model to the hierarchically-laid-out SAN graph to generate a SAN topology layout, wherein attractive and repulsive forces between the SAN components are tuned based on the types of the SAN components and the connectivity information. In addition, the method includes displaying the SAN topology layout on the display area of a display device in a management station coupled to the SAN.

15 Claims, 7 Drawing Sheets

METHOD AND SYSTEM FOR VISUALIZING A STORAGE AREA NETWORK

RELATED APPLICATIONS

Benefit is claimed under 35 U.S.C. 119(a)-(d) to Foreign application Serial No. 1464/CHE/2009 entitled "Method And System For Visualizing A Storage Area Network" by Hewlett-Packard Development Company, L.P., filed on 22 Jun. 2009, which is herein incorporated in its entirety by reference for all purposes.

BACKGROUND

Force-directed algorithms or models may be a class of layout algorithms used for drawing graphs. The force-directed algorithms may employ a method of assigning forces among nodes and edges of a graph representing a network system, for example, a storage area network (SAN). For example, the forces may be assigned as if the nodes are electrically charged particles or as if the edges are springs connecting the nodes. The forces may be applied to the nodes, pulling the nodes closer together or pushing them apart. When the network system comes to an equilibrium state, that is, relative positions of the nodes do not change further on, the graph may then be presented as a visual representation of the network system. However, the graph may be too dense or scattered to adequately represent the network system on a display device. That is, the display device may be equipped with a screen which is too small to adequately visualize all the components of the network system and their connectivity. Further, the nodes in the graph may be positioned without factoring in importance/criticality, or type of the node(s) to be visualized. Accordingly, a system administrator of the network system may have difficulty in properly visualizing the network system as per his or her requirement.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

Methods and systems for visualizing a SAN are disclosed. According to various embodiments of the present invention, the center point of a layout of the SAN may be automatically aligned with the center point of a display device displaying the layout when the layout is first generated. Furthermore, a particular portion or component group of the layout may be presented at the center of the display device upon an occurrence of an event or per user's request. Thus, the embodiments may enable the user to properly visualize a desired portion of the SAN as per his/her requirement.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
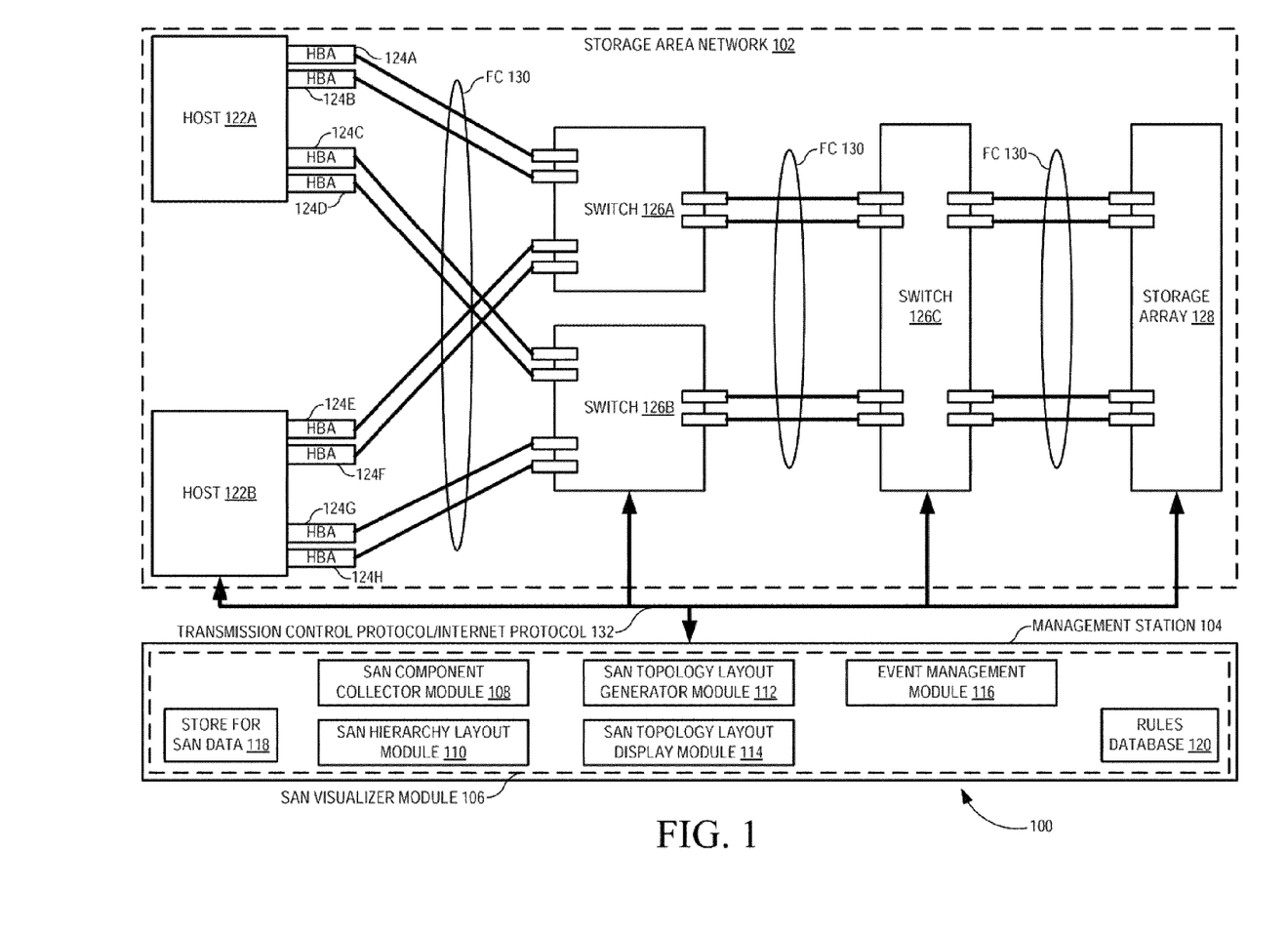
FIG. 1 illustrates a block diagram of an exemplary system for visualizing a SAN, according to one embodiment.

FIG. 1 illustrates a block diagram of an exemplary system 100 for visualizing a SAN 102, according to one embodiment. As illustrated, the system 100 includes a management station 104 coupled to the SAN 102 via communication protocol, such as transmission control protocol/internet protocol 132. The SAN 102 includes a plurality of SAN components such as hosts 122A-B, host bus adapters (HBAs) 124A-H, switches 126A-C, and a storage array 128. As illustrated, the SAN components are connected to each other using a fiber channel (FC) 130.

The management station 104 may be a computer system coupled to the SAN 102 for visualizing the SAN components and their connectivity on a display device of the computer system. As illustrated, the management station 104 includes a SAN visualizer module 106. The SAN visualizer module 106 may be realized through firmware, hardware and/or software. The SAN visualizer module 106 includes a SAN component collector module 108, a SAN hierarchical layout module 110, a SAN topology layout generator module 112, and a SAN topology layout display module 114.

The SAN component collector module 108 may be configured for scanning the SAN components in the SAN 102. In one example embodiment, the SAN components may be scanned to determine respective types of the SAN components and connectivity information between the SAN components. The types of the SAN components may include host, HBA, switch and storage array.

Figure 4:
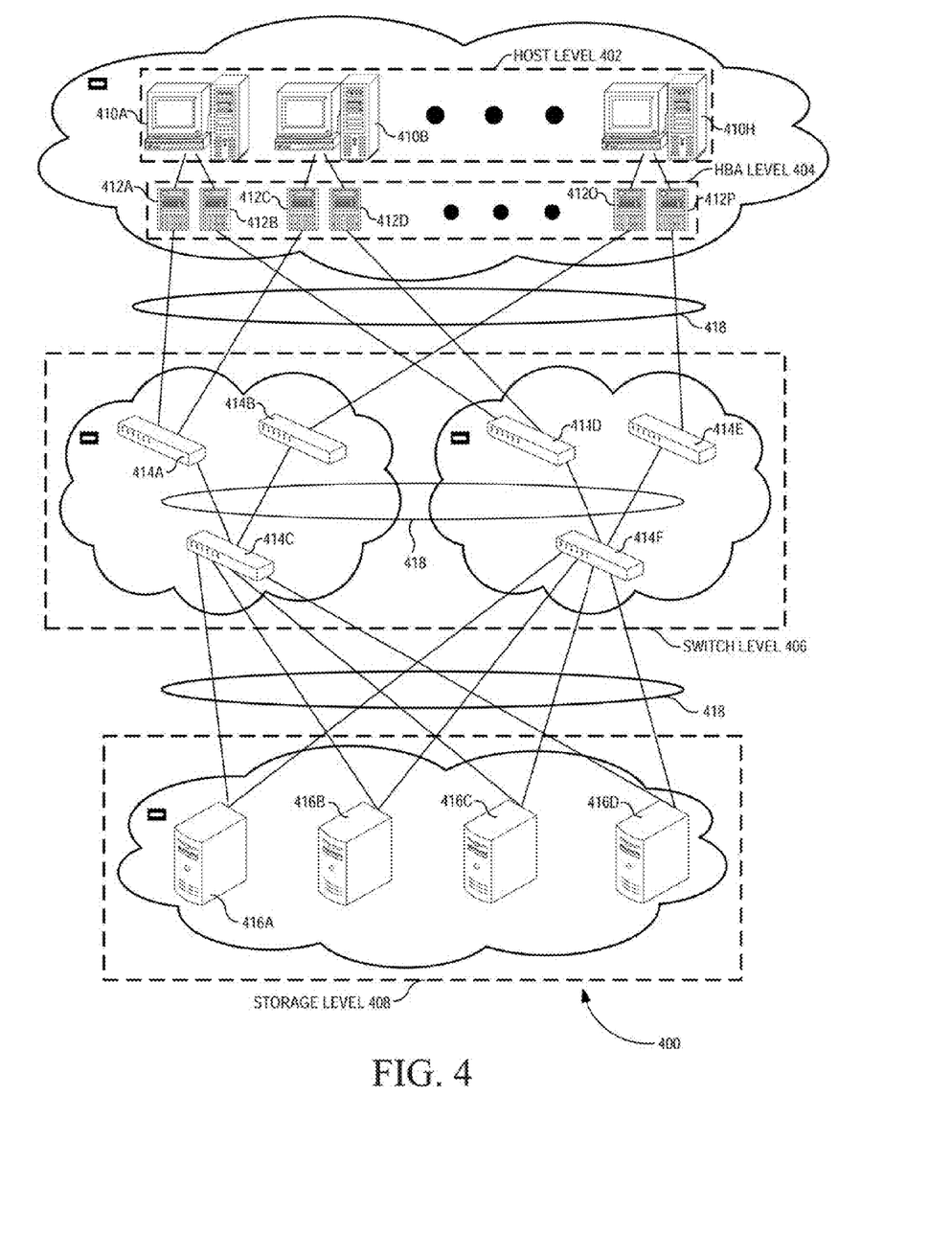
FIG. 4 illustrates an exemplary hierarchically-laid-out SAN graph, according to one embodiment.

The SAN hierarchical layout module 1 10 may be configured for generating a hierarchically-laid-out SAN graph based on the types of the SAN components and their connectivity information. The hierarchically-laid-out SAN graph may represent the SAN components segregated into different levels. For example, different levels may include host level, HBA level, switch level and storage array level, as illustrated in FIG. 4. In one embodiment, the hierarchically-laid-out SAN graph may be generated by determining respective positions of the SAN components in the SAN 102 based on the types of the SAN components and their connectivity information.

Figure 5:
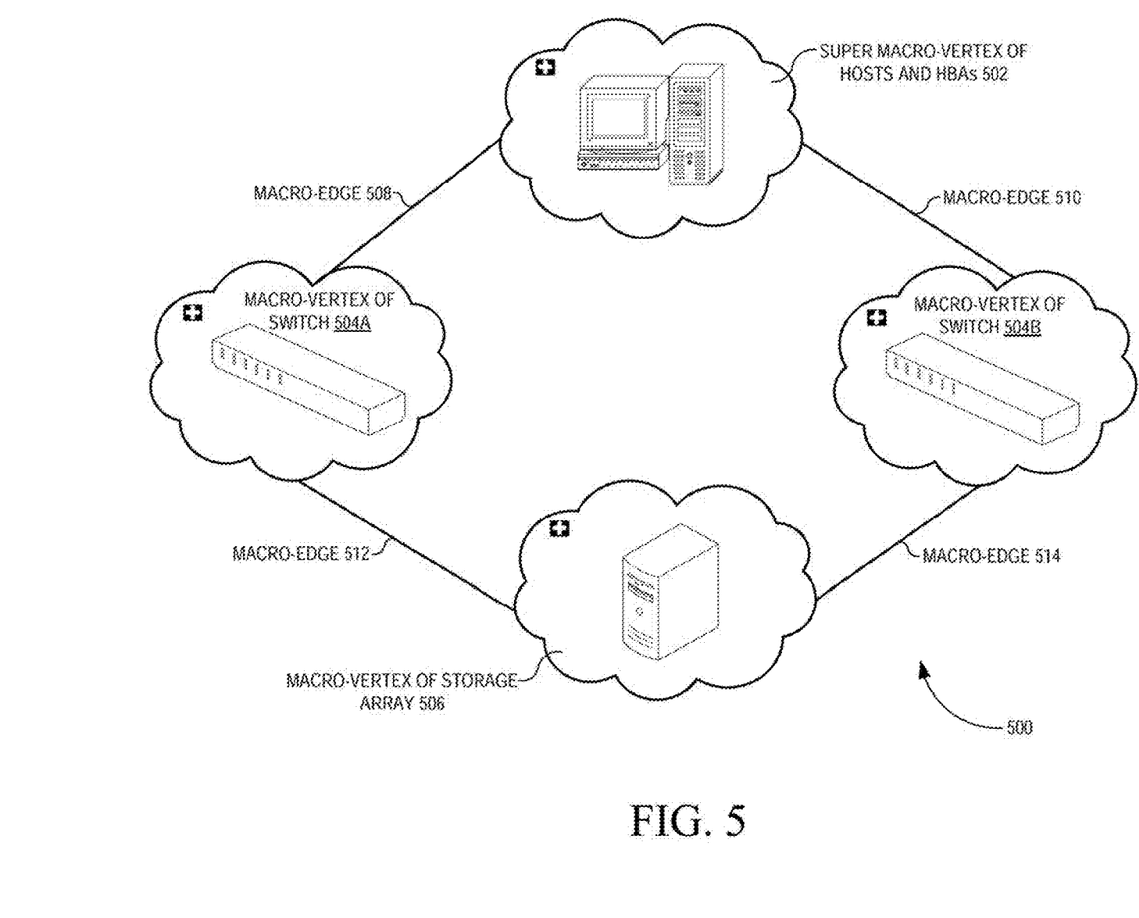
FIG. 5 illustrates an exemplary SAN topology layout, according to one embodiment.

The SAN topology layout generator module 112 may be configured for applying a force-directed model to the hierarchically-laid-out SAN graph to generate a SAN topology layout. The force-directed model may employ a method of assigning forces, for example, attractive and repulsive forces, amongst vertices and edges of the hierarchically-laid-out SAN graph to generate the SAN topology layout. In one example embodiment, the assigned attractive and repulsive forces between the SAN components may be tuned based on the types of the SAN components and their connectivity information. The SAN topology layout may represent an aggregate view of the SAN 102 having a plurality of vertices and a plurality of edges. Each vertex may represent an aggregate of the SAN components in part or in whole and each edge may represent a link that connects a pair of vertices. The SAN topology layout display module 114 may be configured for displaying the SAN topology layout on a display device of the management station 104, as illustrated in FIG. 5.

Figure 6:
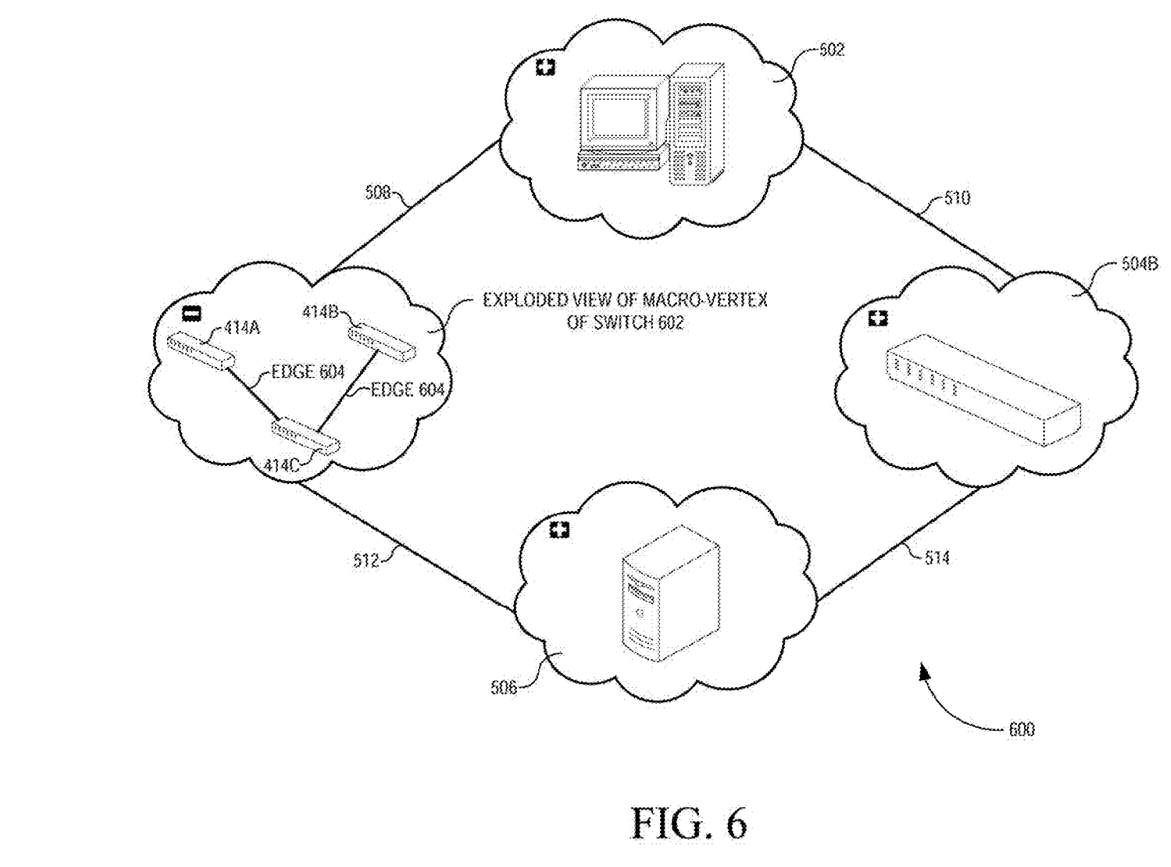
FIG. 6 illustrates the SAN topology layout of FIG. 5 upon an occurrence of an event, according to one embodiment.

The SAN visualizer module 106 also includes an event management module 116, a store for SAN data 118 and a rules database 120. The event management module 116 may be configured for locating a vertex associated with an event upon occurrence of the event in the SAN 102. For example, the event may be associated with a failure of one or more SAN components. The event management module 116 may further be configured for displaying the vertex and the SAN components adjacent to the located vertex once they are located, as illustrated in FIG. 6.

The store for SAN data 118 may be configured for storing data associated with the SAN components. The rules database 120 may be configured for storing a first set of rules for generating the hierarchically-laid-out SAN graph. The rules database 120 may also be configured for storing a second set of rules, for example, vertex-positioning rules, for applying the force-directed model to generate the SAN topology layout. Although the management station 104 is shown as coupled to the SAN 102 in FIG. 1, the management station 104 may reside within the SAN 102.

Figure 2:
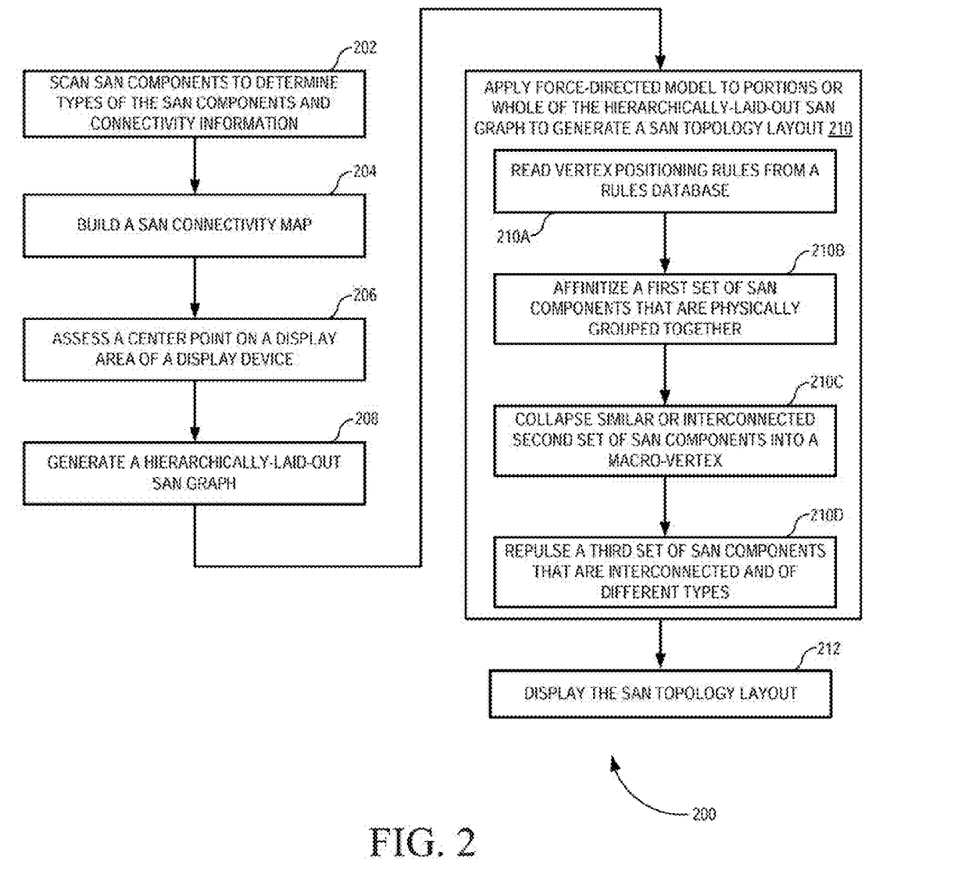
FIG. 2 illustrates a process diagram of an exemplary method for visualizing a SAN, according to one embodiment.

FIG. 2 illustrates a process diagram of an exemplary method 200 for visualizing a SAN, according to one embodiment. At step 202, SAN components in the SAN are scanned to determine respective types of the SAN components and connectivity information. In one example embodiment, the SAN components are scanned using associated internet protocol addresses of each of the SAN components. At step 204, a SAN connectivity map is built based on the types of SAN components and the connectivity information. For example, the SAN connectivity map may include a plurality of vertices representing the SAN components and a plurality of edges representing the connectivity information. The SAN connectivity map may be stored as a data structure.

At step 206, a center point on a display area of a display device in a management station is assessed by determining the size, for example, width w and height h, of the display area. For example, the center point on the display area may be w/2, h/2. At step 208, a hierarchically-laid-out SAN graph is generated. In one example embodiment, the hierarchically-laid-out SAN graph may be generated by determining respective positions of the SAN components based on the types of the SAN components and the connectivity information. At step 210, a force-directed model is applied to portions or whole of the hierarchically-laid-out SAN graph to generate a SAN topology layout. In one exemplary implementation, the force-directed model may be applied as explained below in steps 210A-D.

At step 210A, vertex-positioning rules are read from a rules database. At step 210B, a first set of the SAN components that are physically grouped together are affinitized based on affinity vertex-positioning rules. At step 210C, a second set of the SAN components that are similar or interconnected are collapsed to a macro-vertex based on collapse vertex-positioning rules. At step 210D, a third set of the SAN components that are interconnected and of different types are repulsed based on repulse vertex-positioning rules. The affinity vertex positioning rules, collapse vertex positioning rules and repulse vertex positioning rules are explained in details in FIG. 5.

At step 212, the SAN topology layout is displayed on the display area of the display device. In one exemplary implementation, the SAN topology layout may displayed on the display device by assessing the center point of the display device, as in step 206. Also, in order to display the SAN topology layout, the center point of the SAN topology layout may be assessed by determining the size, for example, the width W and height H, of the SAN topology layout. Then, the center point of the SAN topology layout may be aligned with the center point of a screen of the display device.

Figure 3:
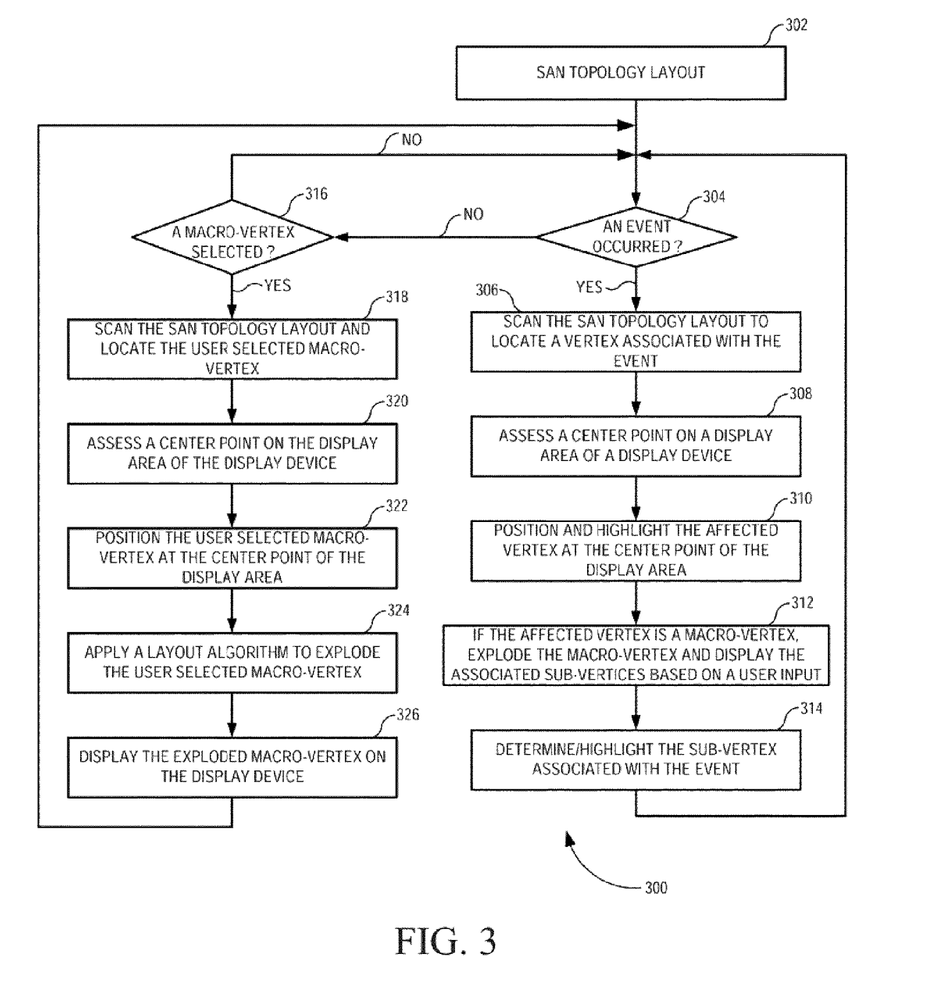
FIG. 3 illustrates a process diagram of an exemplary method for visualizing a SAN upon an occurrence of an event or a receipt of a user input, according to one embodiment.

FIG. 3 illustrates a process diagram of an exemplary method 300 for visualizing a SAN upon an occurrence of an event or a receipt of a user input, according to one embodiment. At step 304, it is determined whether or not an event occurred in a SAN topology layout (302). The event may include a failure of one or more SAN components. If the event has occurred, then step 306 is performed.

At step 306, the SAN topology layout is scanned to locate a vertex associated with the event. At step 308, a center point on a display area of a display device is assessed. At step 310, the vertex affected by the event is positioned and highlighted at the center point of the display area. At step 312, if the vertex is a macro-vertex, the macro-vertex is exploded and its associated sub-vertices are displayed based on a user input. At step 314, the sub-vertex, which may be a component at the center of the event, is determined. Then, the affected sub-vertex may be positioned and highlighted at the center point of the display area. The method 300 then continues to monitor the SAN topology layout at step 304.

If, at step 304, it is determined that no event has occurred in the SAN topology layout, then the method 300 performs step 316. At step 316, it is determined whether or not a macro-vertex is selected by a user. If it is determined that the macro-vertex is selected by the user, then the method 300 performs step 318. If it is determined that the user has not selected the macro-vertex, then the method 300 returns to step 304. At step 318, the SAN topology layout is scanned, and the user-selected macro-vertex is located. At step 320, the center point on the display area of the display device is assessed. At step 322, the user-selected macro-vertex is positioned at the center point of the display area of the display device. At step 324, a layout algorithm is applied to the user-selected macro-vertex to explode the user-selected macro-vertex. At step 326, the exploded macro-vertex is displayed on the display area of the display device. Once step 326 is completed, the method 300 may continue to monitor the SAN topology layout at step 304.

FIG. 4 illustrates an exemplary hierarchically-laid-out SAN graph 400, according to one embodiment. In one example embodiment, the hierarchically-laid-out SAN graph 400 may be generated by determining respective positions of the SAN components in the SAN. Hierarchy may be defined as layering of the SAN components such that physically grouped components are positioned in one or more layers. The one or more layers may be positioned adjacent to each other or one below the other. Further, the number of layers may be computed based on hops across switches from a host to a storage array.

As illustrated, the hierarchically-laid-out SAN graph 400 includes a host level 402, a HBA level 404, a switch level 406, and a storage level 408. The host level 402 includes hosts 410A-H connected to HBAs 412A-P in the HBA level 404. The switch level 406 includes switches 414A-F that connect the hosts 410A-H to storage arrays 416A-D in the storage level 408. It can be also seen in FIG. 4 that, the SAN components in the SAN are connected via connectivity 418, for example, an FC.

The hierarchically-laid-out SAN graph 400 may be generated by determining respective positions of the SAN components as explained below. Positions of the hosts 410A-H in the SAN may be computed adjacent and equally spaced with respect to one another at the top of the display device as the host level 402. Further, positions of the HBAs 412A-P for each of the hosts 410A-H may be computed adjacent and equally spaced with respect to one another below respective hosts at the HBA level 404.

Furthermore, positions of the switches 414A-F for each of the hosts 410A-H may be computed adjacent and equally spaced with respect to one another below the hosts 410A-H and the HBAs 412A-P at the switch level 406. It can be noted that, positions of interconnected switches may be computed at different levels. Moreover, positions of the storage arrays 416A-D for each of the hosts 410A-H may be computed adjacent and equally spaced with respect to one another below the switch level 406 as the storage level 408.

FIG. 5 illustrates an exemplary SAN topology layout 500, according to one embodiment. As illustrated in FIG. 5, the SAN topology layout 500 includes a super macro-vertex of hosts and HBAs 502, which encompasses macro-vertices of switches 504A and 504B, a macro-vertex of storage array 506. Further, the super macro-vertex of hosts and HBAs 502 is connected to the macro-vertex of switch 504A via a macro-edge 508 and to the macro-vertex of switch 504B via a macro-edge 510. Also, the macro-vertices of switches 504A and 504B are connected to the macro-vertex of storage array 506 via a macro-edge 512 and a macro-edge 514 respectively. In one example embodiment, the SAN topology layout 500 may be generated by applying a force-directed model to the hierarchically-laid-out SAN graph 400.

In one embodiment, the force-directed model may be applied to the hierarchically-laid-out SAN graph 400 on per-level basis. In an alternate embodiment, the force-directed model may be applied to the hierarchically-laid-out SAN graph on an entire layout basis. Further, the force-directed model may assign forces, for example, attractive forces and repulsive forces, among vertices and edges of the hierarchically-laid-out SAN graph 400 based on vertex positioning rules stored in the rules database. Furthermore, the attractive forces $f_a(k)$ and repulsive forces $f_r(k)$ between the SAN components may be tuned based on the types of SAN components and the connectivity information.

The attractive force $f_a(k)$ may depend on an optimal distance (k) between all vertices whose layout is to be computed. The attractive force $f_a(k)$ may vary inversely with the optimal distance (k). The repulsive force $f_r(k)$ may depend on an optimal distance (k) between all vertices whose layout is to be computed. The repulsive force $f_r(k)$ may vary directly with the optimal distance (k).

The optimal distance (k) may be expressed as a function of:

$$k = f(p, W, H, n),$$

where, p=percentage of the SAN topology layout which is a tunable parameter, W=width of the SAN topology layout, H=height of the SAN topology layout, and n=number of vertices whose layout is to be computed. An exemplary expression for computing the optimal distance (k) is as below:

$$k = C \lfloor pWH/100n \rfloor,$$

where, C is a tunable parameter from a scaling perspective.

Further, the force-directed model may be applied to the hierarchically-laid-out SAN graph 400 in the manner described below. According to affinity vertex positioning rules, a first set of the SAN components that are physically grouped together are affinitized by increasing the attractive force $f_a(k)$ between the SAN components to a large value than the repulsive force $f_r(k)$ between the SAN components and by retaining the attractive force $f_a(k)$ to a finite value. For example, HBAs on a host are a part of a host system and are tagged as affinitized to that host.

For example, positions of the HBAs on the host may be computed with a large attractive force $f_a(k)$, say with p=2%, in the SAN topology layout 500, so that respective HBAs appear close to the parent host device. Also, positions of the SAN components may be computed with a large attractive force $f_a(k)$, say with p=5%, so that the SAN components appear collated. An exemplary pseudo-code to affinitize host-HBAs in the SAN is given in APPENDIX "A".

Further, according to collapse vertex positioning rules, a second set of the SAN components that are similar or interconnected are collapsed into a macro-vertex, for example, the macro-vertex of switch 504A, by increasing the attractive force $f_a(k)$ between the SAN components to an infinite value and overriding any repulsive force $f_r(k)$ between them. For example, positions of switches that are part of the same macro-vertex may be computed with the attractive force $f_a(k)$ equal to an infinite value, hence collapsing the switches to a point. Also, two or more macro-vertices that are similar or interconnected to one another may be collapsed to form a super macro-vertex using the force-directed model. An exemplary pseudo-code to collapse all switches into the macro-vertex of switch 504A in the SAN is given in APPENDIX "B".

Furthermore, according to repulse vertex positioning rules, a third set of the SAN components that are interconnected and of different types are repulsed by making the repulsive force $f_r(k)$ between the SAN components greater than the attractive force $f_a(k)$ and keeping the repulsive force $f_r(k)$ to a finite value. For example, position of a macro-vertices of hosts and HBAs connected to a macro-vertex of switch may be computed with a large repulsive force $f_r(k)$, say, p=70%, so that the macro-vertices of hosts and HBAs and the macro-vertex of switch move away from one another. An exemplary pseudo-code indicative of repulsing the macro-vertices of hosts and HBAs from the macro-vertices of switches in the SAN is given in APPENDIX "C".

With reference to FIG. 5, the force-directed model may be applied to the hierarchically-laid-out SAN graph 400 such that macro-vertices of hosts and HBAs may be collapsed to form the super macro-vertex of hosts and HBAs 502. Further, the macro-vertices of switches 504A and 504B may be repulsed from the super macro-vertex of hosts and HBAs 502 such that the hosts-HBAs and the switches are positioned away from each other. Similarly, the macro-vertex of storage array 506 may be repulsed from the macro-vertices of switches 504A-B and is positioned accordingly.

Also, a drill-down view of the SAN components of any macro-vertex in the SAN topology layout 500 may be presented to a user by exploding the macro-vertex into sub-vertices constituting that macro-vertex. In such a case, other macro-vertices in the SAN topology layout 500 may be retained in their aggregated view. For example, to achieve this, the force-directed model may be applied to a set of vertices including exploded vertices of a macro-vertex and other macro vertices. The exploded vertices may be displayed at the center point of the display device. Exemplary pseudo-code to explode the macro-vertex of switch is given in an APPENDIX "D". Further, the user may collapse the vertices back to the macro-vertex by applying the force-directed model as described above.

FIG. 6 illustrates the SAN topology layout of FIG. 5 upon an occurrence of an event, according to one embodiment.

Particularly, FIG. 6 illustrates an exploded view of macro-vertex of switch 602 displayed on the display device upon occurrence of an event or a warning in the macro-vertex of switch 504A. For example, the event may include a failure of one or more of the switches 414A-C in the macro-vertex of switch 504A.

As an event occurs in the macro-vertex of switch 504A, a display area of a display device may be adjusted automatically to position and highlight the macro-vertex of switch 504A at the center point of the display device. Further, to view the event, the user may be allowed to drill down by exploding the affected macro-vertex of switch 504A into associated sub-vertices. As illustrated in FIG. 6, the exploded view of macro-vertex of switch 602 displays switches 414A-C connected through the edges 604. Then, the sub-vertex in which the event occurred may be positioned and highlighted at the center point of the display device. In this manner, the user may be allowed to drill down further to reach a source of the event. Exemplary pseudo-code for viewing the event is given in APPENDIX "E".

When an event occurs in a macro-edge, the display device may automatically adjust its display area, for example a screen, to position and highlight vertices associated with the macro-edge at the center point of the display device. To view the event, the user may further be allowed to drill-down by exploding the affected macro-edge to view sub-edges constituting the macro-edge as described above. Subsequently, the sub-edge in which the event occurred may be positioned and highlighted at the center point of the display device. The user may be allowed to drill-down further to reach the source of the event.

Also, when multiple events occur in the SAN, the user may be allowed to navigate through the events using 'previous' and 'next' controls. When 'next' control is activated, the macro-vertex or the macro-edge in the SAN topology layout 500, where the next event has occurred, may be positioned and highlighted at the center point of the display area of the display device. When 'previous' control is activated, the macro-vertex or the macro-edge in the SAN topology layout 500, where the previous event has occurred, may be positioned and highlighted at the center point of the display area of the display device. Further, while the user navigates through the events occurred in the SAN, the events may be ordered based on attributes such as severity level like critical, warning and informational. In such a case, the critical events may be displayed to the user first, followed by warning and informational events.

Figure 7:
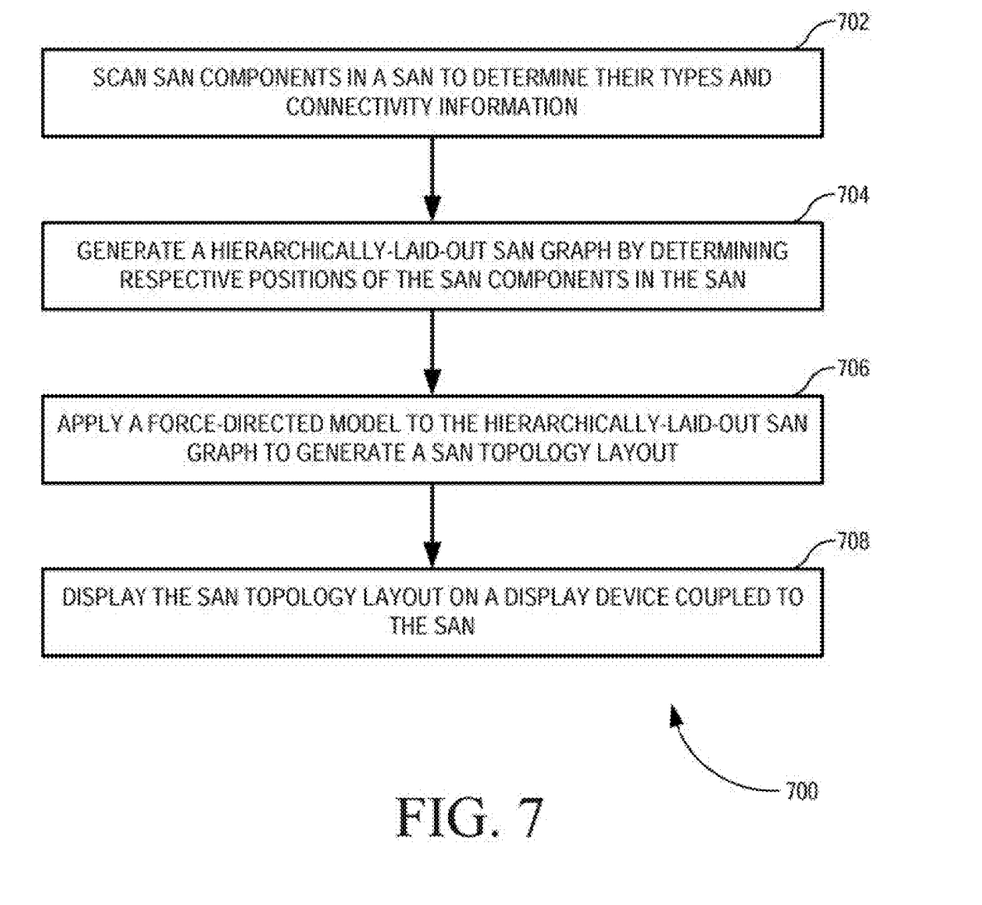
FIG. 7 illustrates a process flow chart of an exemplary method of visualizing a SAN, according to one embodiment.

FIG. 7 illustrates a process flow chart 700 of an exemplary method of visualizing a SAN, according to one embodiment. At step 702, SAN components in the SAN are scanned to determine respective types of SAN components and connectivity information. At step 704, a hierarchically-laid-out SAN graph is generated by determining respective positions of the SAN components in the SAN. At step 706, a force-directed model is applied to the hierarchically-laid-out SAN graph to generate a SAN topology layout. At step 708, the SAN topology layout is displayed on a display area of the display device coupled to the SAN. Moreover, in one example embodiment, a computer readable medium for visualizing the SAN has instructions that, when executed by a computer, cause the computer to perform the method illustrated in FIG. 7.

In various embodiments, the methods and systems described in FIGS. 1 through 7 may enable a user to minimize amount of time spent in visualizing, comprehending and diagnosing a SAN by positioning SAN components in a display device. In one example embodiment, the SAN components may be positioned based on their relative affinity to one another, such that they are co-related easily. Further, a bird's eye view or in-focus detailed view of a portion of the SAN may be visualized in the display device. The user can also drill-down a SAN topology layout in the display device to quickly and easily view significant events in the SAN or the SAN components.

APPENDIX "A" depicts the pseudo-code for affinitizing the host-HBAs in the SAN.

APPENDIX "B" depicts the pseudo-code for collapsing switches in the SAN.

APPENDIX "C" depicts the pseudo-code for repulsing the macro-vertices of the hosts and HBAs from the macro-vertices of switches in the SAN.

APPENDIX "D" depicts the pseudo-code for exploding the macro-vertex of switch in the SAN.

APPENDIX "E" depicts the pseudo-code for viewing the event in the SAN.

Although the present embodiments have been described with reference to specific example embodiments, it will be evident that various modifications and changes may be made to these embodiments without departing from the broader spirit and scope of the various embodiments.

APPENDIX A

Algorithm AffinitizeHostHBAs(G:SAN Graph)
Read Host-HBAs-affinity vertex-positioning rule D from rules database.
Scan through the SAN graph G.
Identify each host in G that has one or more HBAs.
Create vertex-group V, with the host and its HBAs.
Invoke ComputeLayout(V, D)
Add affinitized vertex-group V to G.

APPENDIX B

Algorithm CollapseSANFabricSwitches(G:SAN Graph)
Read Collapse-Fabric-Switches vertex-positioning rule D from rules database.
Scan through the SAN graph G.
Identify each fabric in G.
Create vertex-group V, with the switches from the identified fabric.
Invoke ComputeLayout(V, D)
Add collapsed vertex-group V as a macro-vertex to G.

APPENDIX C

Algorithm RepluseHostSwitchMacroVertices(G:SAN Graph)
Read Repulse-Hosts-Switches vertex-positioning rule D from rules database.
Scan through the SAN graph G.
Identify & add host macro-vertices to vertex-group V1.
Identify & add switch macro-vertices to vertex-group V2.
Create vertex-group V := {V1, V2}.
Invoke ComputeLayout(V, D).

APPENDIX D

Algorithm ExplodeSwitchMacroVertex(G:SAN Graph, U:user input)
Read Explode-Switch-Macro-Vertex vertex-positioning rule D from rules database.
Scan through the SAN graph G.
M := Switch macro-vertex in G for user input U.
Assess center C of user's visible display area.
Adjust topology display to position macro-vertex M at C.
Invoke ComputeLayout(M, D) to explode M.
Display exploded macro-vertex M centered on C.

APPENDIX E

```
Algorithm DisplaySANEvent(G:SAN Graph, E:SAN Event)
Scan through the SAN graph G.
Locate macro-vertex M in G where event E has occurred.
Assess center C of user's visible display area.
Adjust topology display to position macro-vertex M at C.
Highlight macro-vertex M.
Upon user input, explode M into its sub-vertices.
Invoke DisplaySANEvent(M, E)
```

What is claimed is:

1. A method for visualizing a storage area network (SAN), comprising:
   scanning SAN components in the SAN to determine respective types of the SAN
      components and connectivity information between the SAN components;
   generating a hierarchically-laid-out SAN graph by determining respective positions of the SAN components in the SAN based on the types of the SAN
      components and the connectivity information;
   applying a force-directed model to the hierarchically-laid-out SAN graph to generate a SAN topology layout, wherein attractive and repulsive forces between the SAN components are tuned based on the types of the SAN components and the connectivity information; and
   displaying the SAN topology layout on a display device coupled to the SAN.

2. The method of claim 1, wherein the type of the SAN components and the connectivity information between the SAN components are stored in a data structure as a SAN connectivity map.

3. The method of claim 2, wherein the SAN connectivity map comprises a plurality of vertices representing the SAN components and a plurality of edges representing the connectivity information.

4. The method of claim 1, wherein the displaying the SAN topology layout comprises:
   determining a size of a display area of the display device and a size of the SAN topology layout;
   assessing a center point of the display area of the display device and a center point of the SAN topology layout; and
   presenting the SAN topology layout on the display area of the display device by coordinating the center point of the SAN topology layout at the center point of the display area of the display device.

5. The method of claim 1 wherein the positions in the hierarchically-laid-out SAN graph comprises a host level, a HBA level, a switch level, and a storage level.

6. The method of claim 1, wherein the applying the force-directed model comprises:
   affinitizing a first set of the SAN components that are physically grouped together;
   collapsing a second set of the SAN components that are similar or interconnected into a macro-vertex; and
   repulsing a third set of the SAN components that are interconnected and of different types.

7. The method of claim 1, further comprising:
   scanning through the SAN topology layout;
   locating a vertex with an event, wherein the event comprises a failure of at least one of the SAN components; and
   displaying the vertex with adjacent ones of the SAN components on the display device.

8. The method of claim 7, wherein the displaying the vertex further comprises:
   exploding the vertex when the vertex is a macro-vertex; and
   displaying at least one sub-vertex of the macro-vertex when the at least one-sub vertex is selected for displaying.

9. The method of claim 1, further comprising:
   receiving a macro-vertex selected;
   scanning the SAN topology layout to locate the macro-vertex; and
   displaying the macro-vertex on the display device.

10. A system for visualizing a SAN, comprising:
    a SAN comprising a plurality of SAN components; and
    a management station coupled to the SAN and including a SAN visualizer module comprising:
       a SAN component collector module configured for scanning SAN components
          in the SAN to determine respective types of the SAN
             components and connectivity information between the SAN components;
       a SAN hierarchy layout module configured for generating a hierarchically-laid-out SAN graph by determining respective positions of the SAN
          components in the SAN based on the types of the SAN
             components and the connectivity information;
       a SAN topology layout generator module configured for applying a force-directed model to the hierarchically-laid-out SAN graph to generate a SAN
          topology layout, wherein attractive and repulsive forces between the SAN
             components are tuned based on the types of the SAN components and the connectivity information; and
       a SAN topology layout display module configured for displaying the SAN topology layout on a display device coupled to the SAN.

11. The system of claim 10, wherein the SAN visualizer module comprises an event management module configured for locating a vertex with an event in the SAN topology layout and displaying the vertex with adjacent ones of the SAN components on the display device.

12. The system of claim 10, wherein the SAN visualizer module comprises a store for SAN data associated with the SAN components.

13. The system of claim 10, wherein the SAN visualizer module comprises a rules database for storing a first set of rules associated with the generating a hierarchically-laid-out SAN graph and a second set of rules associated with the applying the force-directed model.

14. The system of claim 10, wherein the types of the SAN components comprise a host, a host bus adapter (HBA), a switch, and a storage array.

15. A non-transitory computer readable medium for visualizing a SAN storing instructions that, when executed by a computer, cause the computer to perform a method comprising:
    scanning SAN components in a SAN to determine respective types of the SAN
       components and connectivity information between the SAN components;
    generating a hierarchically-laid-out SAN graph by determining respective positions of the SAN components in the SAN based on the types of the SAN
       components and the connectivity information;
    applying a force-directed model to the hierarchically-laid-out SAN graph to generate a SAN topology layout, wherein attractive and repulsive forces between the SAN components are tuned based on the types of the SAN components and the connectivity information; and
    displaying the SAN topology layout on a display device coupled to the SAN.

* * * * *